United States Patent [19]

Clemens et al.

[11] E Re. 30,039

[45] Reissued Jun. 26, 1979

[54] SEGMENTED AND CUSHIONED IDLER FOR TRACK-TYPE VEHICLES

[75] Inventors: Donald E. Clemens, Tremont; Donald A. Piepho, Aurora; Stephen W. Reiss, Dunlap, all of Ill.

[73] Assignee: Caterpillar Tractor Co., Peoria, Ill.

[21] Appl. No.: 875,044

[22] Filed: Feb. 3, 1978

Related U.S. Patent Documents

Reissue of:

[64] Patent No.: 3,937,528
Issued: Feb. 10, 1976
Appl. No.: 507,527
Filed: Sep. 19, 1974

[51] Int. Cl.[2] ..... B62D 55/14

[52] U.S. Cl. ..... 305/21; 74/230.5; 74/448

[58] Field of Search ..... 305/21, 26, 56, 57; 301/87, 86, 31; 152/47, 49, 50, 51, 52; 74/443, 230.5, 230.11, 448

[56] References Cited

U.S. PATENT DOCUMENTS

| | | | |
|---|---|---|---|
| 425,734 | 4/1890 | Birch | 74/230.5 |
| 1,206,172 | 11/1916 | Thomas | 74/448 |
| 2,065,866 | 12/1936 | Mijnssen | 301/31 |
| 2,707,884 | 5/1955 | Boisvert | 74/448 |
| 3,504,562 | 4/1970 | Hirych | 74/443 X |
| 3,771,843 | 11/1973 | Clasper et al. | 74/243 R |

FOREIGN PATENT DOCUMENTS

| | | | |
|---|---|---|---|
| 22099 of | 1906 | United Kingdom | 152/49 |

*Primary Examiner*—John P. Shannon
*Attorney, Agent, or Firm*—James R. Bell

[57] ABSTRACT

A track-type vehicle, such as a crawler tractor, comprises a pair of endless tracks mounted on either side thereof. Each of the tracks is entrained over a drive sprocket at its rearward end and over an idler at its forward end. The idler comprises a hub having a plurality of arcuate rim segments releasably attached on an annular flange thereof to define annular, track-engaging bearing surfaces. Each of the segments may be attached to the idler at a circumferentially disposed tongue and groove arrangement and an elastomeric cushioning and noise damping means may be disposed between each segment and the flange. One or more of the segments may be replaced in situ by merely moving the vehicle to expose the same.

29 Claims, 6 Drawing Figures

SEGMENTED AND CUSHIONED IDLER FOR TRACK-TYPE VEHICLES

Matter enclosed in heavy brackets [ ] appears in the original patent but forms no part of this reissue specification; matter printed in italics indicates the additions made by reissue.

BACKGROUND OF THE INVENTION

The idlers employed to support the forward ends of endless tracks of track-type tractors are subjected to severe impact loads and to a high rate of wear during tractor operation. The problems occasioned thereby are extensively discussed in U.S. Pat. No. 3,771,843, assigned to the assignee of this application. Replacement of such an idler requires dismantling of the endless track and thus necessitates a substantial "downtime" of the vehicle. In addition, various governmental regulations require a substantial suppression of the noise level normally prevalent during tractor operation.

SUMMARY OF THIS INVENTION

An object of this invention is to provide an economical, durable and non-complex idler construction for a track-type vehicle which is readily serviceable without having to dismantle the endless track thereof. The idler comprises a hub having an annular flange on the periphery thereof and a plurality of arcuate segments circumferentially disposed on the flange to define a continuous rim having track bearing surfaces thereon and fastening means releasably attaching each of the segments to the hub.

In the preferred embodiment of this invention, an annular elastomeric cushioning means is disposed between the segments and the flange to absorb shock loads and to reduce the noise level of the endless track during operation thereof. The segments may be replaced sequentially in situ by moving the vehicle to expose one of the segments, replacing such segment and thereafter again moving the vehicle to rotate the idler to expose another replaceable segment.

BRIEF DESCRIPTION OF THE DRAWINGS

Other objects of this invention will become apparent from the following description and accompanying drawings wherein.

DETAILED DESCRIPTION

Figure 1:
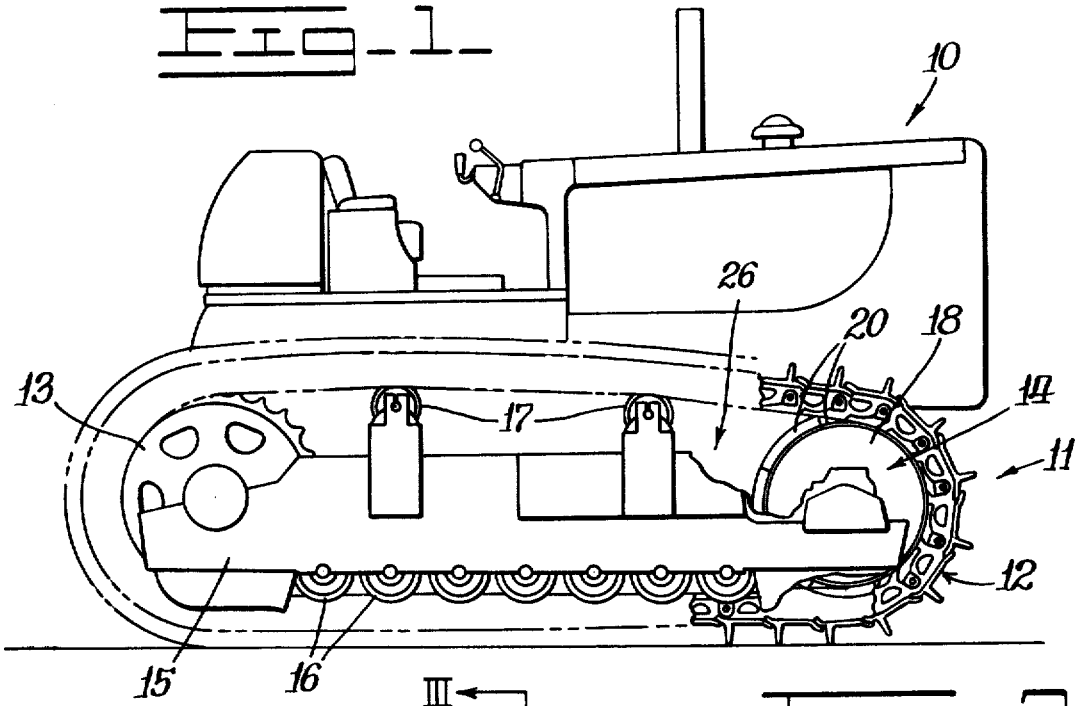
FIG. 1 is a side elevational view of a track-type tractor employing a first segmented and cushioned idler embodiment of this invention in each of the track assemblies thereof.

FIG. 1 illustrates a track-type tractor 10 comprising a pair of endless track assemblies 11 (one shown) mounted on either side thereof. Each track assembly comprises an endless track 12 entrained about a drive sprocket 13 at the rearward end thereof and about a first idler embodiment 14 at a forward end thereof. The drive sprocket and idler are rotatably mounted on a sub-frame 15 having a plurality of track rollers 16 rotatably mounted thereon along with a pair of carrier rollers 17 in a conventional manner.

Figure 2:
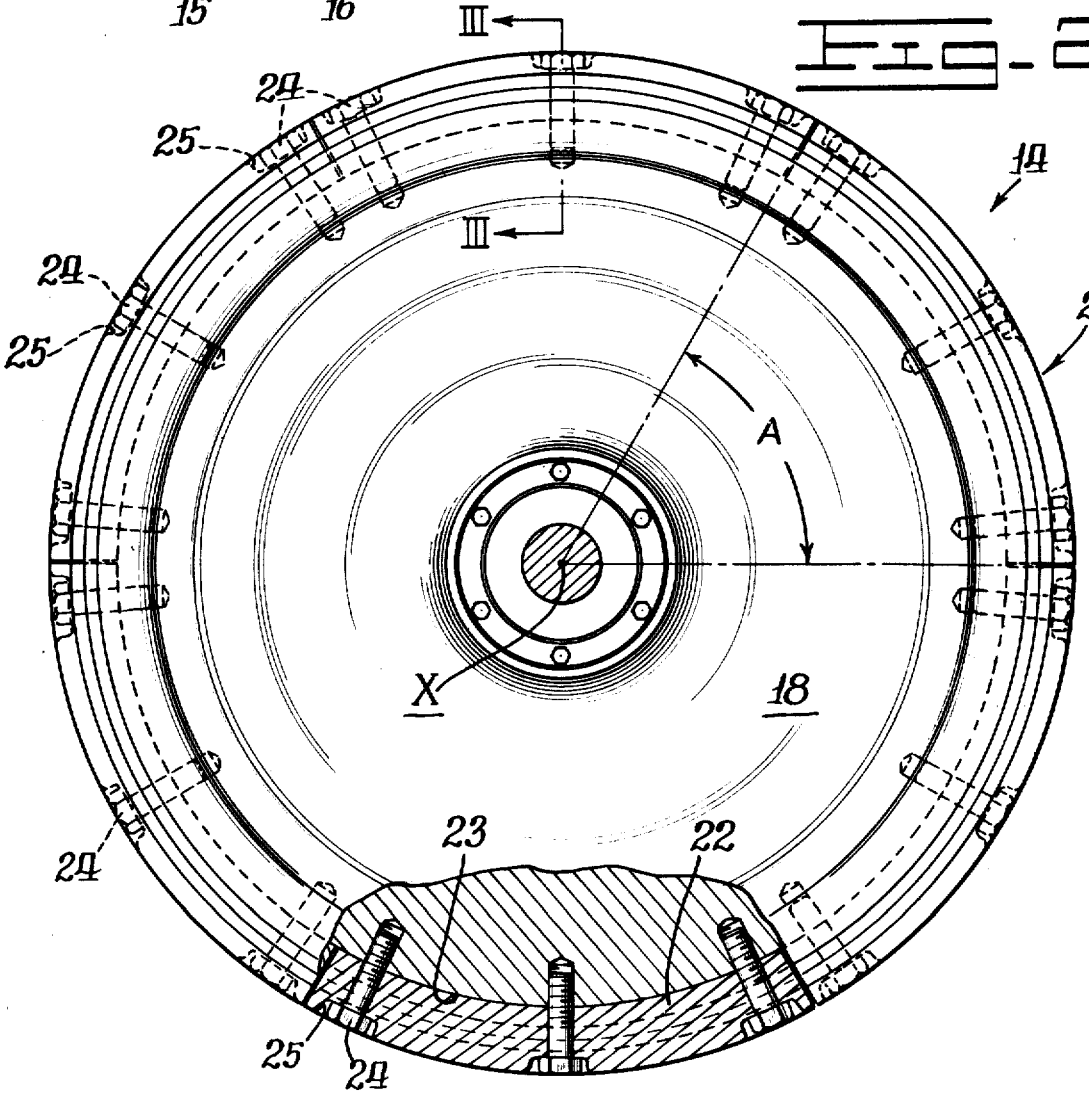
FIG. 2 is an enlarged side elevational view of such idler.
Figure 3:
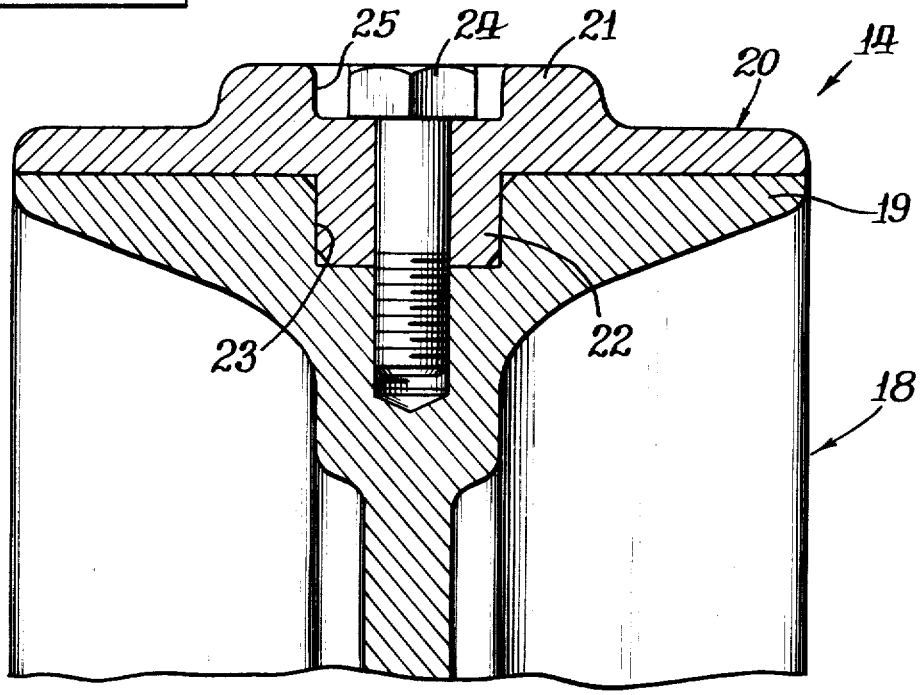
FIG. 3 is an enlarged sectional view of the idler, taken in the direction of arrows III—III in FIG. 2.

Referring to FIGS. 2 and 3, idler 14 comprises a hub 18, adapted for rotation about a central axis X thereof, having an annular flange 19 integrally formed on the periphery thereof. A plurality of arcuate segments 20 are circumferentially disposed on the flange to define a rim having substantially continuous track bearing surfaces thereon. Such surfaces may be defined by a centrally disposed and raised annular chain guide 21 having a pair of recessed annular bearing surfaces disposed on either side thereof. Each segment is keyed to a periphery of flange 19 by a tongue and groove arrangement comprising an arcuate pilot flange 22 extending radially inwardly towards rotational axis X of the idler and disposed in a like-shaped slot 23 formed in the flange of the hub.

Each segment is releasably attached to the hub by fastening means, preferably comprising three circumferentially disposed bolts 24 extending radially inwardly towards axis X and threadably attached to the hub. First and second bolts are disposed adjacent to respective circumferential ends of segment whereas the third bolt is disposed intermediate the ends thereof. The heads of the bolts are each disposed in a recess 25 formed in chain guide 21 to prevent such bolt heads from interfering with the entrainment of the track assembly thereover.

Referring to FIG. 2, each segment has a circumferential length subscribed by an arc defined by an included angle A equalling three hundred and sixty degrees divided by the number of segments. In the preferred embodiments of this invention such angle constitutes 60° to thus provide six segments for the rim. The segmented construction of the rim facilitates expeditious replacement of one or more segments in situ, without necessitating dismantling of endless track assembly 11.

In particular, should it become necessary to replace a worn or damaged segment 20 in FIG. 1, the workman need only release three bolts 24, remove such segment and replace it with a new one. The method of this invention contemplates moving the vehicle either rearwardly or forwardly along its longitudinal axis to dispose another replaceable segment at an exposed access opening 26 of the endless track assembly. The above enumerated procedure may be repeated to replace as many segments as is necessary.

Figure 4:
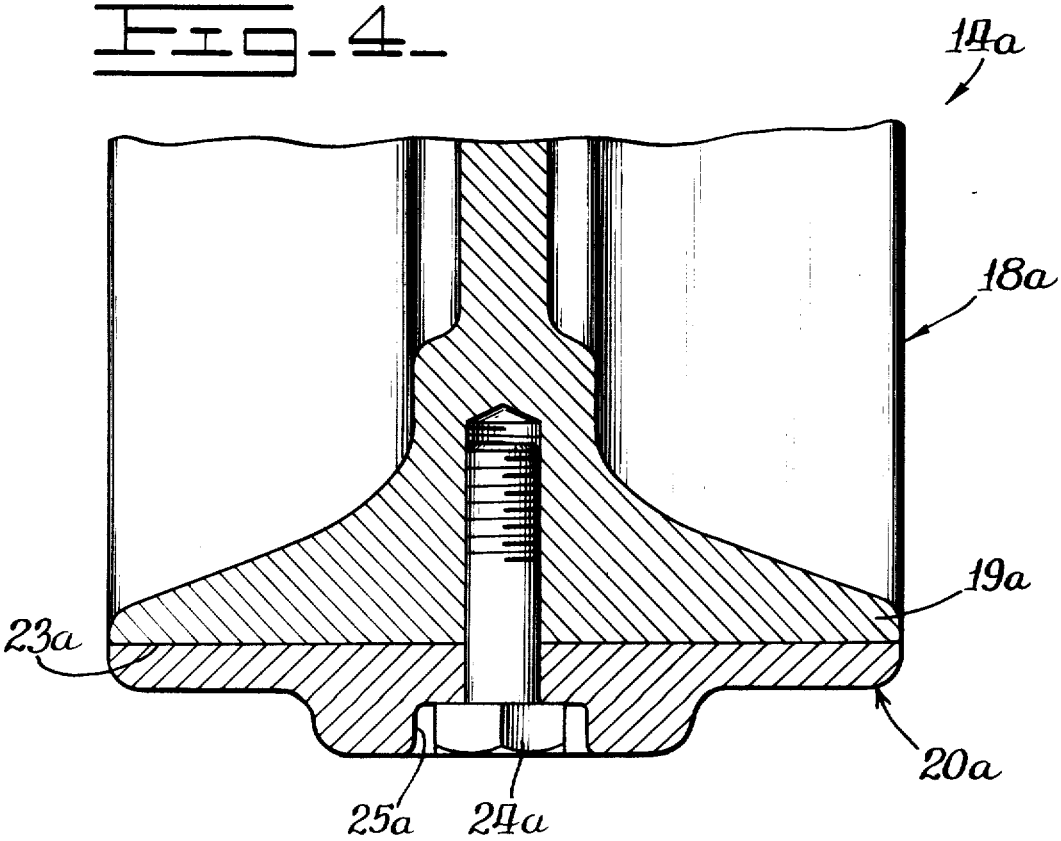
FIG. 4 is a view similar to FIG. 3, but inverted and illustrating a second idler embodiment of this invention.
Figure 5:
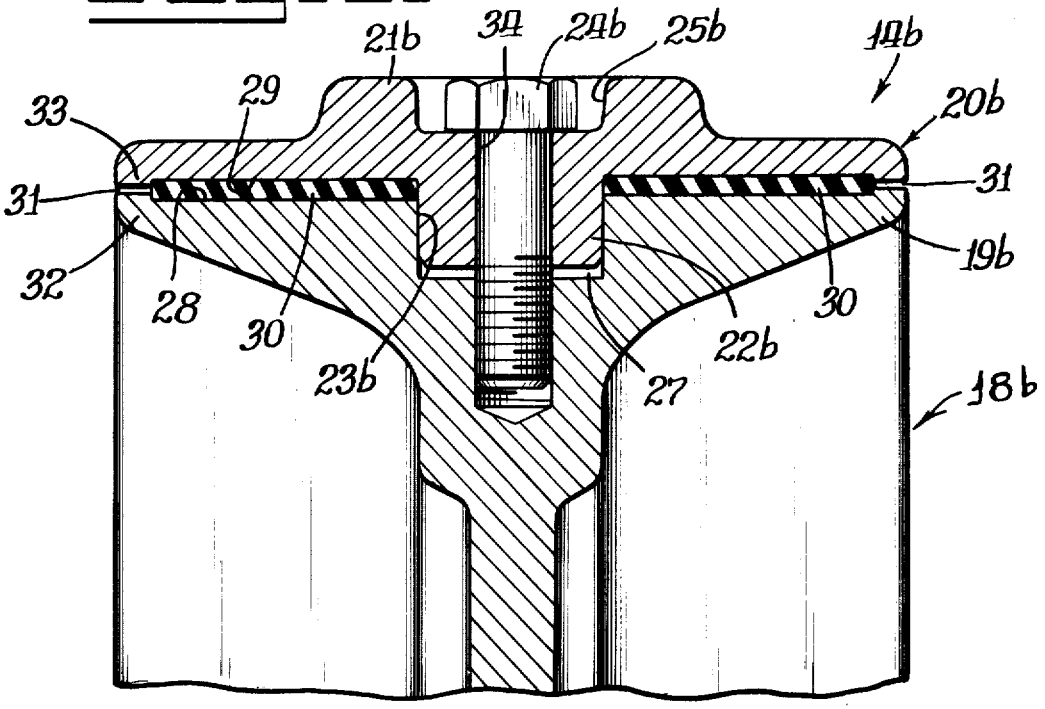
FIGS. 5 and 6 are views similar to FIG. 3, but illustrating third and fourth idler embodiments of this invention, respectively.
Figure 6:
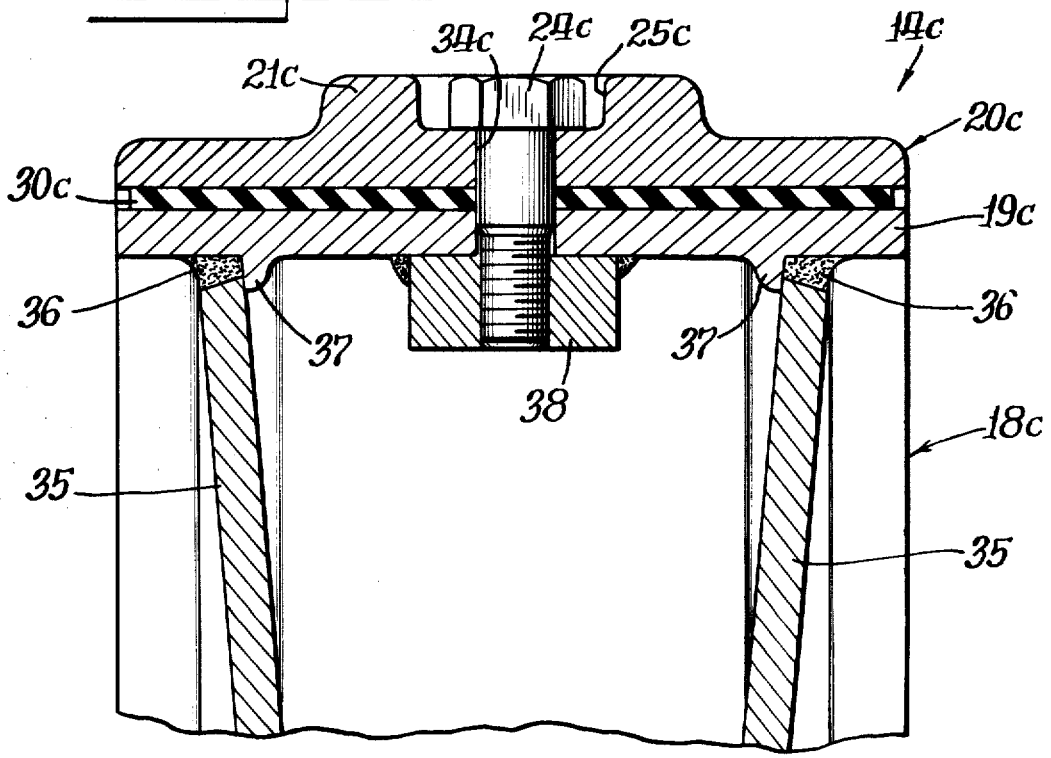

FIGS. 4–6 each illustrate three additional idler embodiments wherein identical numerals are used to depict corresponding constructions. Numerals depicting modified constructions in FIGS. 4–6 are each accompanied by a letter "a, "b" or "c". It should be understood that the FIGS. 4–6 idlers substantially conform to the FIGS. 1–3 idler, except for the modified constructions hereinafter described.

Referring to FIG. 4, a second idler embodiment 14a comprises a hub 18a having an annular flange 19a formed integrally on the periphery thereof. The cylindrical outer surface of the flange abuts the cylindrical undersides of a plurality of circumferentially disposed and rim-defining arcuate segments 20a, releasably attached thereon by bolts 24a.

Referring to FIG. 5, a third idler embodiment 14b comprises a hub 18b having a plurality of circumferentially disposed segments 20b releasably attached on the periphery of a flange 19b thereof by bolts 24b to define an annular rim thereon. Each segment has a radially inwardly extending pilot flange 22b formed thereon to extend radially inwardly to terminate short of a bottom wall defining a slot 23b, formed in the hub, to thus provide a circumferential clearance 27 therebetween. Two pairs of circumferentially extending recesses 28 and 29 are formed in the hub's flange and the segment, respectively, to retain elastomeric cushioning means 30 comprising a apair of elastomeric (e.g., rubber or plastic) strips therein.

A clearance 31 is defined on each outboard end of the idler, between annular flanges 32 and 33 of the hub's flange and the segment, respectively. Strips 30 function to absorb impact loads imposed on the idler during vehicle operation and also aid in suppressing the noise level of the endless tracks. Clearances 27 and 31 cooperate with the strips to permit slight reciprocal movement of the segment on shanks of bolts 24b which are provided with a sufficient clearance by a mounting bore 34, formed through the segment, to permit the same.

Referring to FIG. 6, a fourth idler embodiment 14c comprises a hub 18c having a pair of laterally spaced and radially disposed disc-shaped plates 35. The plates are each secured at its periphery to an underside of a cylindrical flange 19c by an annular weld 36. An annular flange 37 is formed internally on flange 19c to accurately position plate 34 thereat and to provide a backup means for weld 36.

A unitary and circumferentially extending elastomeric cushioning means or strip 30c is sandwiched between flange 19c and a plurality of circumferentially disposed segments 20c to completely cover the same. A plurality of bolts 24c extend through strip 30c and are each releasably attached to a boss 38, secured centrally to an underside of flange 19c. Elastomeric cushioning means 30c functions in a manner similar to cushioning means 30, employed in the above-described FIG. 5 embodiment. It should be understood that a similar cushioning means could be also utilized in conjunction with the FIGS. 1-3 and FIG. 4 embodiments.

We claim:

1. In a track-type vehicle of the type having a pair of endless tracks mounted on either side thereof and wherein a forward end of each of said tracks is entrained about an idler disposed for rotation about an axis thereof, the improvement wherein said idler comprises a hub having an annular flange on the periphery thereof, a plurality of arcuate segments circumferentially disposed on said flange about said axis to define a rim having substantially continuous annular bearing surfaces on the periphery thereof, *said segments including an arcuate pilot flange extending radially inwardly toward said axis and disposed in a like-shaped slot formed on a periphery of the flange of said hub, said annular bearing surfaces defined on either side of a raised, annular chain guide formed circumferentially about said segments* and fastening means *extending through said pilot flange* releasably attaching each of said segments to said hub said fastening means [comprising a plurality of circumferentially spaced bolts] extending radially inwardly towards said axis, through each of said segments and threadably attached to said hub.

[2. The vehicle of claim 1 wherein the circumferential length of each of said segments is subscribed by an arc defined by an included angle equalling three hundred and sixty degrees divided by the total number of said segments.]

[3. The vehicle of claim 2 wherein said included angle is sixty degrees.]

4. The vehicle of claim 1 wherein [said annular bearing surfaces are defined on either side of a raised, annular chain guide formed circumferentially about said segments] *said fastening means comprises a plurality of circumferentially spaced bolts.*

5. The vehicle of claim [1] *4* wherein three of said bolts releasably attach each of said segments to said hub.

6. The vehicle of claim 5 wherein first and second bolts are each disposed adjacent to a respective circumferential end of each segment and a third bolt is circumferentially disposed intermediate the ends of such segment.

7. The vehicle of claim 1 wherein [a head of each of said bolts] *each fastening means* is disposed in a recess formed in [a] *the* raised annular chain guide formed on said rim.

[8. The vehicle of claim 1 wherein each of said segments comprises an arcuate pilot flange extending radially inwardly from such segment towards said axis and disposed in a like-shaped slot formed on a periphery of the flange of said hub.]

9. The vehicle of claim 1 wherein perpheral surfaces of said segments and the flange of said hub are cylindrical.

10. The vehicle of claim 1 further comprising elastomeric cushioning means disposed between said segments and the flange of said hub.

11. The vehicle of claim 10 wherein [each of said segments comprises an arcuate pilot flange extending radially inwardly from such segment towards said axis and disposed in a like-shaped slot formed on a periphery of the flange of said hub and wherein] said elastomeric cushioning means comprises a pair of arcuate strips disposed on either side of said pilot flange.

12. The vehicle of claim 11 wherein each of said strips is disposed in a mating recess formed in each respective segment and the flange of said hub.

13. The vehicle of claim 11 wherein outboard ends of each of said segments are each spaced radially outwardly slightly from an underlying end of the flange of said hub to define a clearance thereat and wherein a radially inner end of the pilot flange of each segment terminates short of a wall defining a bottom of said slot to define a clearance therebetween.

14. The vehicle of claim 10 wherein said cushioning means comprises a unitary strip of elastomeric material at least substantially covering an outer periphery of the flange of said hub, said fastening means projecting radially inwardly through said strip.

15. The vehicle of claim 1 wherein said hub comprises a pair of laterally spaced and radially disposed plates secured to an underside of the flange thereof.

16. The vehicle of claim 15 further comprising a plurality of circumferentially disposed bosses secured to an underside of the flange of said hub, intermediate lateral ends thereof, and wherein each of said fastening means comprises a bolt threadably mounted in a respective one of said bosses.

17. A track-type vehicle idler disposed for rotation about an axis thereof comprising a hub having an annular flange on the periphery thereof, a plurality of arcuate segments circumferentially disposed on said flange about said axis to define a rim having continuous annular bearing surfaces on the periphery thereof, [elastomatic] *said segments including an arcuate pilot flange extending radially inwardly toward said axis and disposed in a slot formed on a periphery on the flange of said hub, elastomeric* cushioning means disposed between each of said segments and the flange of said hub and fastening means releasably attaching each of said segment to said hub, *said fastening means extending through said pilot flange radially inwardly toward said axis.*

18. The idler of claim 17 wherein the circumferential length of each of said segments is subscribed by an arc defined by an included angle equalling three hundred and sixty degrees divided by the total number of said segments.

19. The idler of claim 18 wherein said included angle is sixty degrees.

20. The idler of claim 17 wherein said annular bearing surfaces are defined on either side of a raised, annular chain guide formed circumferentially about said segments.

21. The idler of claim 17 wherein said fastening means comprises a plurality of circumferentially spaced bolts extending radially inwardly towards said axis, through each of said segments and threadably attached to said hub.

22. The idler of claim 21 wherein three of said bolts releasably attach each of said segments to said hub.

23. The idler of claim 22 wherein first and second bolts are each disposed adjacent to a respective circumferential end of each segment and a third bolt is circumferentially disposed intermediate the ends of such segment.

24. The idler of claim 23 wherein a head of each of said bolts is disposed in a recess formed in a raised annular chain guide formed on said rim.

[25. The idler of claim 18 wherein each of said segments comprises an arcuate pilot flange extending radially inwardly from such segment towards said axis and disposed in a like-shaped slot formed on a periphery of the flange of said hub.]

26. The idler of claim 17 wherein peripheral surfaces of said segments and the flange of said hub are cylindrical.

27. The idler of claim 17 wherein [each of said segments comprises an arcuate pilot flange extending radially inwardly from such segment towards said axis and disposed in a like-shaped slot formed on a periphery of the flange of said hub and wherein] said elastomeric cushioning means comprises a pair of arcuate strips disposed on either *side of* said [positioning] *pilot* flange.

28. The idler of claim 27 wherein each of said strips is disposed in a mating recess formed in each respective segment and the flange of said hub.

29. The idler of claim 27 wherein outboard ends of each of said segments are each spaced radially outwardly slightly from an underlying end of the flange of said hub to define a clearance thereat and wherein a radially inner end of the pilot flange of each segment terminates short of a wall defining a bottom of said slot to define a clearance therebetween.

30. The idler of claim 17 wherein said cushioning means comprises a unitary cylindrical strip at least substantially covering an outer periphery of the flange of said hub, said fastening means projecting radially inwardly through said strip.

31. The idler of claim 17 wherein said hub comprises a pair of laterally spaced and radially disposed plates secured to an underside of the flange thereof.

32. The idler of claim 31 further comprising a plurality of circumferentially disposed bosses secured to an underside of the flange of said hub and wherein each of said fastening means comprises a bolt threadably mounted in a respective boss.

33. A track-type vehicle idler disposed for rotation about an axis thereof comprising a hub having an annular flange on the periphery thereof, a plurality of arcuate segments circumferentially disposed on said flange about said axis to define a rim having continuous annular bearing surfaces on the periphery thereof, [and fastening means releasably attaching each of said segments to said hub, each of said segments comprising] an arcuate pilot flange extending radially inwardly from such segment towards said axis and disposed in a like-shaped slot formed on a periphery of the flange of said hub *and fastening means extending through said pilot flange releasably attaching each of said segments to said hub, said fastening means extending radially inwardly toward said axis.*

[34. A track-type vehicle idler disposed for rotation about an axis thereof comprising a hub having an annular flange on the periphery thereof, a plurality of arcuate segments circumferentially disposed on said flange about said axis to define a rim having continuous annular bearing surfaces on the periphery thereof and fastening means releasably attaching each of said segments to said hub, said hub further comprising a pair of laterally spaced and radially disposed plates secured to an underside of the flange thereof.]

[35. The idler of claim 34 further comprising a plurality of circumferentially disposed bosses secured to an underside of the flange of said hub and wherein each of said fastening means comprises a bolt threadably mounted in a respective boss.]

* * * * *